United States Patent [19]

Nakanishi et al.

[11] Patent Number: 4,897,800

[45] Date of Patent: Jan. 30, 1990

[54] ELECTRONIC GRAPH DRAWING APPARATUS

[75] Inventors: Akira Nakanishi, Sakurai; Yasuhiro Nakanishi, Nara, both of Japan

[73] Assignee: Sharp Kabushiki Kaisha, Osaka, Japan

[21] Appl. No.: 528,657

[22] Filed: Sep. 1, 1983

[30] Foreign Application Priority Data

Sep. 8, 1982 [JP] Japan .................................. 57-157324

[51] Int. Cl.$^4$ .......................... G06F 15/62; G09G 1/06
[52] U.S. Cl. ..................................... 364/520; 364/521; 364/710.13; 340/753; 340/734; 340/121; 178/23 R
[58] Field of Search ............................... 364/518–521, 364/582, 710; 340/721, 722, 734, 753, 754; 318/568; 178/18, 23 R

[56] References Cited

U.S. PATENT DOCUMENTS

| RE. 30,743 | 9/1981 | Shelley et al. | 364/520 |
|---|---|---|---|
| 3,487,308 | 12/1969 | Johnson | 340/722 |
| 3,624,370 | 11/1971 | Gray, Jr. | 364/520 |
| 4,272,808 | 6/1981 | Hartwig | 364/521 |
| 4,291,305 | 9/1981 | Kimura et al. | 340/734 |
| 4,295,135 | 10/1981 | Sukonick | 340/734 |
| 4,302,755 | 11/1981 | Pisani et al. | 340/734 |
| 4,322,816 | 3/1982 | Spangler et al. | 364/520 |
| 4,435,772 | 3/1984 | Suzuki et al. | 364/520 |
| 4,447,888 | 5/1984 | Kuecker et al. | 364/521 |
| 4,506,336 | 3/1985 | Hird | 364/520 |

OTHER PUBLICATIONS

Swonger et al., "A Machine For Generating Graphic Charts", Int'l Pub. Number WO82/00726, 3/4/82.

Primary Examiner—Parshotam S. Lall
Assistant Examiner—Joseph L. Dixon
Attorney, Agent, or Firm—Birch, Stewart, Kolasch & Birch

[57] ABSTRACT

An electronic graph drawing apparatus comprises an input device for inputting numerical data, a memory responsive to the input device for storing the input data, a selection circuit responsive to the memory for selecting the maximum numerical data from the input numerical data, and a define circuit responsive to the selection circuit for defining an integer as the maximum of the scale in a graph to be drawn. Additionally, a second define circuit may be provided for defining the number of sectional divisions between the maximum scale and the minimum scale. Further, a scale assignment circuit may be provided for assigning scale information. Still further a line drawing circuit may be provided for drawing broken lines parallel to the X- and the Y-axis.

5 Claims, 4 Drawing Sheets 4,897,800

ELECTRONIC GRAPH DRAWING APPARATUS

BACKGROUND OF THE INVENTION

The present invention relates to a graph drawing apparatus and, more particularly, to an electronic graph drawing apparatus or graph plotter capable of printing out graphs according to input numerical data.

Conventionally, graph drawing apparatuses apply the maximum of input numerical data directly to the maximum point of the graph scale and, in addition, the distance between the minimum of the scale and the maximum of the scale is divided into equal sections for proper scaling.

Therefore, when the maximum of the input numerical data is not a whole number, having a fractional portion designated by numerals to the right of a decimal point, all of the scale items between the maximum scale and the respective scale sections are formed by calculations including this decimal fraction. This is disadvantageous in that the resultant graph becomes unnatural and difficult to read.

Further, in the conventional graph drawing apparatuses, the respective sectional scale items are printed out only on the X- and the Y-axis, so that any graph paper can be used to draw a line graph and a bar graph, but it is difficult to use roll paper having no sectional scale items far from the X- and the Y-axis because the relation between the scale items and the numerical data is uncertain to the person studying the graph.

SUMMARY OF THE INVENTION

Accordingly, it is an object of the present invention to provide an improved graph drawing apparatus which will compensate for when the maximum of the scale contains a fraction.

It is another object of the present invention to provide an improved graph drawing apparatus for preventing respective scale items between minimum scale and maximum scale from containing a fraction.

It is a further object of the present invention to provide an improved graph drawing apparatus for drawing broken lines parallel to the X- and/or the Y-axis in a graph in conformance with respective scale items and input numerical data.

Briefly described, in accordance with the present invention, an electronic graph drawing apparatus comprises an input device for inputting numerical data, a memory means responsive to the input device for storing the input numerical data, a selection means responsive to the memory means for selecting maximum numerical data from the input numerical data, and a defining means responsive to the selection means for defining an integer for maximum scale in a graph to be drawn.

In a specific form of the present invention, a second defining means is additionally provided for defining the number of sectional divisions between the maximum scale and the minimum scale, and a scale assignment means may be provided for assigning sectional scale information in the respective scale sections.

In a further specific form of the present invention, a line drawing means is further additionally provided for drawing broken lines parallel to the X- and/or the Y-axis within a graph.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
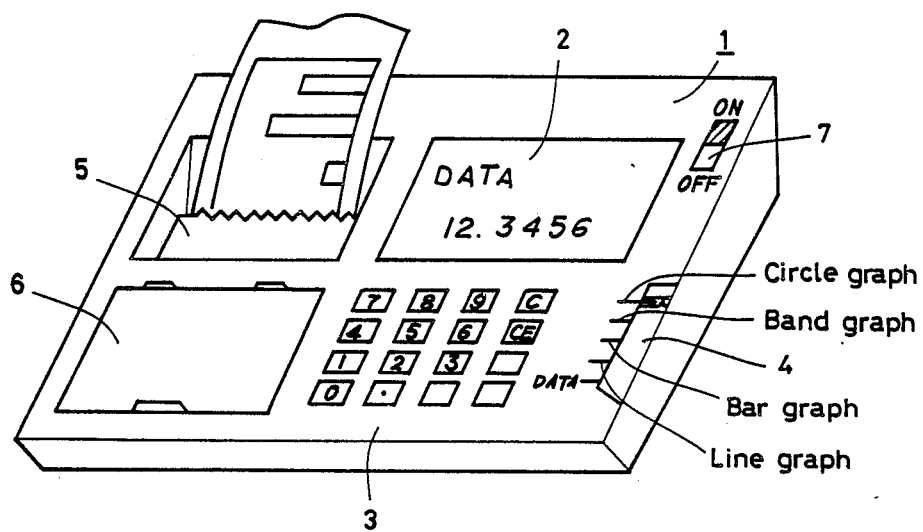
FIG. 1 shows a perspective view of an electronic graph drawing apparatus according to the present invention.

FIG. 1 shows a perspective view of an electronic graph drawing apparatus of the present invention. The apparatus comprises a main body 1 of a rectangular cubic box-like configuration, a display 2 provided on the main body 1, a keyboard 3 for effecting control through the input of various data for preparation of required graphs, a switch 4 (for example, in the form of a slide switch) for designating types or kinds of graphs including a mode for a circle graph, a band graph, a bar graph, and a line graph, a printer 5 for preparing graphs according to the present invention, a print paper storing section 6 for accomodating therein print paper such as a roll paper or the like, and a power switch 7, all of which are laid out on the front face of the main body 1, side by side as illustrated.

The keyboard 3 further includes, for example, ten-keys actuated for inputting data such as scale information, a decimal point key, a clear key (C) for clearing the data, and a clear/entry key (CE) actuated for clearing-/entering the data.

Figure 2:
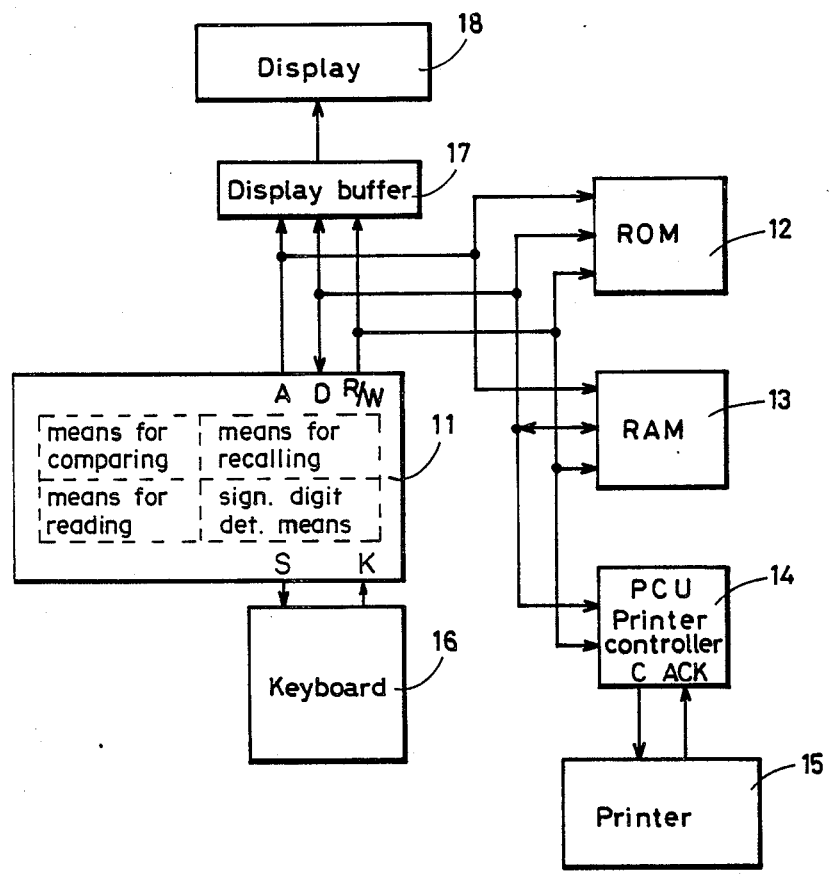
FIG. 2 shows a block diagram of a circuit implemented within the graph drawing apparatus of FIG. 1.

FIG. 2 shows a block diagram of a circuit implemented within the graph drawing apparatus of FIG. 1.

The circuit of FIG. 2 comprises a CPU 11, a ROM 12, a RAM 13, a printer controller (PCU) 14, a printer 15, a keyboard 16, a display buffer 17, and a display 18.

The keyboard 16 of FIG. 2 is related to the like 3 of FIG. 1. The display 18 of FIG. 2 is related to the like 2 of FIG. 1.

According to a program as stored within the ROM 12, the CPU 11 reads in key input information upon the keyboard 16. The CPU 11 serves to transfer the contents of the RAM 13 toward the display buffer 17, so that the display 18 displays the information. The CPU 11 further serves to transfer the contents of the RAM 13 toward the PCU 14, so that the printer 15 prints out the information.

The ROM 12 stores the program to perform the reading of the key input information upon the keyboard 16, the displaying on the display 18, and the printing on the printer 15. Further, the ROM 12 stores a program for causing the CPU 11 to operate according to numerical information and formula information as stored within the RAM 13.

The RAM 13 comprises registers A, B, C, or the like for storing the key input information including numerical data, character data, and formula data inputted with the keyboard 16, and the operation results. The RAM 13 further comprises flags and counters to be used for the operation of the CPU 11.

The PCU 14 is responsive to the numerical data and the character data from the CPU 11 for generating specific patterns for the numerical data and the charcter data. The PCU 14 is further responsive to print control commands from the CPU 11 for decoding the print control commands such as the upward/downward movement and the line movement of a print pen. The printer 15 is responsive to the output of the PCU 14 for printing out the numerical data and the character data, and for moving the pen upward, downward etc.

The keyboard 16 contains ten-keys, A–Z alphabet keys, function keys, and the switch 4. The typing key input information can be detected by using key strobe signals outputted by the CPU 11 and common signals entered into the CPU 11.

The display buffer 17 is responsive to the numerical data and the character data transferred from the CPU 11 for forming display information suitable for the display 18, so that the display 18 displays the information.

According to the present invention, the graph drawing apparatus is operated as follows:

The keyboard 16 is actuated to input numerical data, so that the RAM 13 stores the data in its data memory. The CPU 11 is operated to detect maximum numerical data from these input numerical data. The CPU 11 is further operated to detect which classification the higher N-figures of the maximum data belong to among classifications of the table of the RAM 13 as will be described below.

Thus, maximum integer scale as referred to "SCALE MAX" hereinbelow, the divisional number between a minimum scale item and a maximum scale item, and their pitches are all selected and defined to draw a graph according to the numerical input data.

The divisional number is used to draw broken lines parallel to the X-axis in the respective sectional scale items in the graph. The scale pitches are used to assign the respective sectional scale items. The number of the input numerical data items is used to draw broken lines parallel to the Y-axis.

For example, it is assumed that six numerical data as shown in TABLE I are inputted by the keyboard 16.

TABLE I

| DATA NO. | NUMERICAL DATA |
|---|---|
| 1 | 223.4 |
| 2 | 68.3 |
| 3 | 373.3 |
| 4 | 150.8 |
| 5 | 98.7 |
| 6 | 288.8 |

The maximum of the data "373.3" is detected by comparing the respective data. The two leftmost digits, "37" of this maximum data, are selected for analysis, omitting the digit immediately to the left of the decimal point and all of the digits after the decimal point.

The RAM 13 stores the following table as shown in TABLE II.

TABLE II

| CLASS | TWO HIGHEST DIGITS OF MAX DATA | SCALE MAX | DIV. NO. | PITCH |
|---|---|---|---|---|
| A | $10 \leq\ <20$ | 20 | 4 | 5 |
| B | $20 \leq\ <40$ | 40 | 4 | 10 |
| C | $40 \leq\ <60$ | 60 | 4 | 15 |
| D | $60 \leq\ <80$ | 80 | 4 | 20 |
| E | $80 \leq\ <99$ | 100 | 5 | 20 |

According to the classifications as stored within the RAM 13, it is detected which one of the classifications the above two digits "37" belong to. Then, the maximum scale on the Y-axis is detected to be "40", so that, because the digit immediately to the left of the decimal must be accounted for on the graph, the value of "400" is printed out on the graph, the divisional number on the Y-axis is detected to be "4", and the scale pitch on the Y-axis is detected to be "10" which must be represented to be "100" in the graph.

Figure 3:
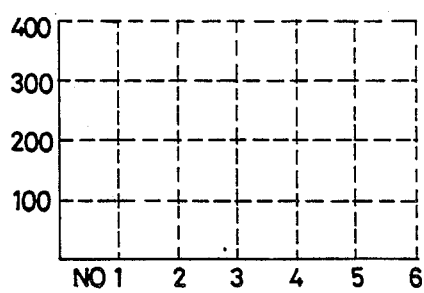
FIGS. 3 and 4 show figures of a pre-graph and a graph according to the present invention, respectively.
Figure 4:
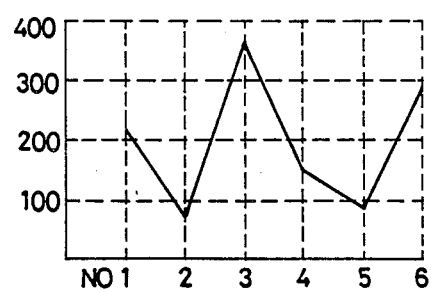
Figure 5:
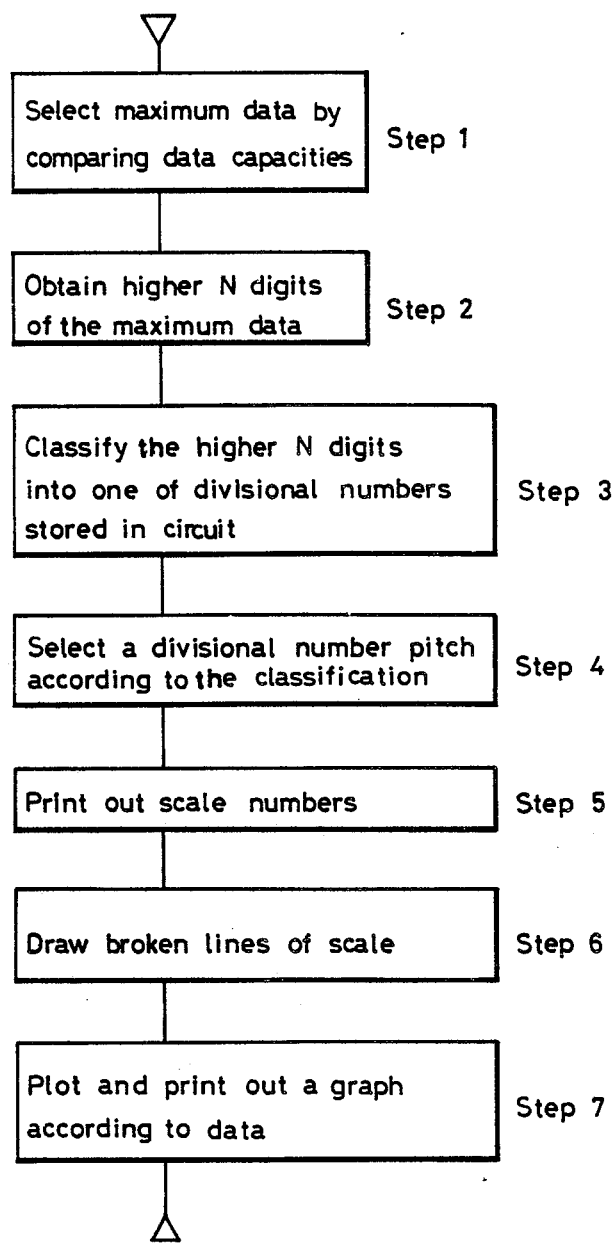
FIGS. 5 and 6 show flow charts of the operation according to the present invention.

FIGS. 3 and 4 show a pre-graph and a graph according to this detection. FIG. 5 shows a flow chart of the graph preparation steps.

With reference to FIG. 3, the number of the input numerical data items is printed out on the X-axis. The maximum scale of "400" is printed out on the Y-axis. The respective sectional scale items and the broken lines parallel to the X- and the Y-axis are printed out, as well.

With reference to FIG. 4, the graph data are plotted to complete the graph.

FIG. 5 shows these graph preparation steps.

Figure 6:
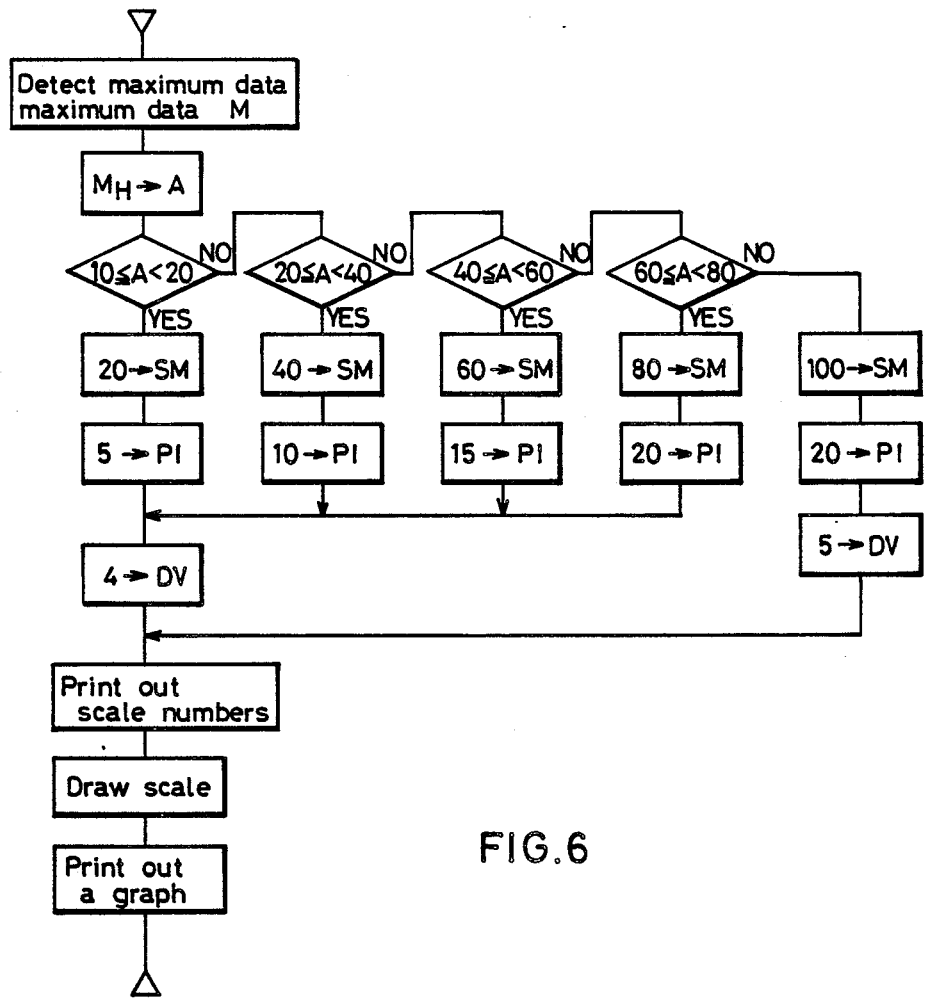

FIG. 6 shows a concrete flow chart of that of FIG. 5.

In the flow chart of FIG. 6, "MH" indicates the two highest digits. The RAM 13 comprises the following registers:

register M for storing the maximum data
register A
register SM for storing the maximum scale "SCALE MAX"
register DV for storing the number of equal divisions
register PI for storing the pitch.

With reference to FIG. 6, the maximum data are detected from the input numerical data, so that these data are entered into the register M. The two highest digits of the maximum data in the register M are entered into the register A as a two-figure value. According to the contents of the register A, the values for the registers SM, DU, and PI are selected.

When $10 \leq A < 20$, the value of "20" is entered into the register SM. The value of "5" is entered into the register PI. The value of "4" is entered into the register DV.

When $20 \leq A < 40$, the value of "40" is entered into the register SM, the value of "10" is entered into the register PI, and the value of "4" is entered into the register DV.

When $40 \leq A < 60$, the value of "60" is entered into the M, the value of "15" is entered into the PI, and the value of "4" is entered into the D.

When $60 \leq A < 80$, the value of "80" is entered into the SM, the value of "20" is entered into the PI, and the value of "4" is entered into the DV.

When $80 \leq A < 99$, the value of "100" is entered into the SM, the value of "20" is entered into the PI, and the value of "5" is entered into the DV.

The scale items are printed out according to the contents of the registers SM, DV, and PI. The broken lines of scale are printed out according to the contents of the register DV and the input data. Finally, the input data are plotted and printed out.

In the above preferred embodiment of the present invention, the minimum value is assumed to be zero in drawing the graph. When some minimum value is specified, the above detection is carried out as to the difference between the maximum value and the minimum value.

The broken lines parallel to the X- and the Y-axis can be freely formed. The display 2 and 18 can be replaced by any information display such as a cathode ray tube (CRT).

According to the present invention, even when the maximum value contains a fraction, the maximum scale and the respective sectional scale items can be represented as integers. Further, any lines such as the broken lines can be drawn parallel to the X- and the Y-axis to make the graph readable.

While only certain embodiments of the present invention have been described, it will be apparent to those skilled in the art that various changes and modifications may be made therein without departing from the spirit and scope of the present invention as claimed.

What is claimed is:

1. An electronic graph drawing apparatus comprising:

input means for introducing a plurality of numerical data values desired to be graphed;

first memory means, responsive to said input means, for storing said introduced numerical data values;

second memory means for storing graph drawing information including maximum scale information and number of divisions for a plurality of graph classes, each said graph class corresponding to a class range of values of maximum data to be printed; and processor means for producing graph scale data from said plurality of numerical data values, said processor means using stored logic programs, and comprising, maximum value selection means for determining the maximum data value of said plurality of numerical data values stored in said first memory means, means, responsive to said maximum value selection means, for comparing said maximum data value selected thereby to said class range of values corresponding to each said graph class as stored in said second memory means, and for selecting said graph class having a class range of values within which said maximum data falls, means, responsive to selection of said graph class by said means for comparing and selecting, for recalling said graph drawing information from said second memory means, and means, responsive to said graph drawing information from means for recalling, for reading said numerical data values from said first memory means and for printing a graph in said selected graph class of said plurality of data values, said means for reading and printing further printing scale indicia and scale lines.

2. The graph drawing apparatus of claim 1 wherein said scale information includes the placement of scale lines on said graph and the labels thereof.

3. The graph drawing apparatus of claim 1 wherein said means for printing prints said scale lines in two dimensions.

4. The graph drawing apparatus of claim 1 wherein said class range of values of minimum data to be printed is stored in said second memory means.

5. The graph drawing apparatus of claim 1 wherein said processor means further comprises significant digit determination means, responsive to said maximum selection means for recognition only a selection number of most significant digits for supply to said means for comparing and selecting.

* * * * *